(12) United States Patent
Li et al.

(10) Patent No.: US 12,430,794 B2
(45) Date of Patent: Sep. 30, 2025

(54) ONLINE MATCHING AND OPTIMIZATION METHOD COMBINING GEOMETRY AND TEXTURE, 3D SCANNING DEVICE, SYSTEM AND NON-TRANSITORY STORAGE MEDIUM

(71) Applicant: SHENZHEN JIMUYIDA TECHNOLOGY CO. LTD, Shenzhen (CN)

(72) Inventors: Yunqiang Li, Shenzhen (CN); Ying Chen, Shenzhen (CN); Yong Ding, Shenzhen (CN); Wei Luo, Shenzhen (CN)

(73) Assignee: SHENZHEN JIMUYIDA TECHNOLOGY CO. LTD, Shenzhen (CN)

( * ) Notice: Subject to any disclaimer, the term of this patent is extended or adjusted under 35 U.S.C. 154(b) by 360 days.

(21) Appl. No.: 18/121,573

(22) Filed: Mar. 14, 2023

(65) Prior Publication Data
US 2023/0237693 A1   Jul. 27, 2023

Related U.S. Application Data

(63) Continuation-in-part of application No. PCT/CN2021/107088, filed on Jul. 19, 2021.

(30) Foreign Application Priority Data

Jun. 4, 2021  (CN) .......................... 202110625611.5

(51) Int. Cl.
G06T 7/73       (2017.01)
G06T 7/246      (2017.01)
(Continued)

(52) U.S. Cl.
CPC ................ *G06T 7/73* (2017.01); *G06T 7/248* (2017.01); *G06T 7/40* (2013.01); *G06T 7/50* (2017.01);
(Continued)

(58) Field of Classification Search
None
See application file for complete search history.

(56) References Cited

U.S. PATENT DOCUMENTS

2019/0026943 A1 * 1/2019 Yan ......................... G06T 7/344
2019/0362157 A1 * 11/2019 Cambias ............... G06V 10/255
2021/0110599 A1 * 4/2021 Fang ......................... G06T 7/55

FOREIGN PATENT DOCUMENTS

CN   108010081     5/2018
CN   109658449     4/2019
(Continued)

OTHER PUBLICATIONS

International Search Report issued in corresponding International application No. PCT/CN2021/107088, mailed Mar. 2, 2022.
(Continued)

*Primary Examiner* — SJ Park
*Assistant Examiner* — Caroline E. Depalma

(57) ABSTRACT

An online matching and optimization method combining geometry and texture and a three-dimensional (3D) scanning system are provided. The method includes obtaining pairs of depth texture images with a one-to-one corresponding relationship, and collecting the pairs of the depth texture images including depth images by a depth sensor and collecting texture images by a camera device; adopting a strategy of coarse to fine to perform feature, matching on the depth texture images corresponding to a current frame and on the depth texture images corresponding to the target frames, to estimate a preliminary pose of the depth sensor in the 3D (Continued)

scanning system; combining a geometric constraint and a texture constraint to optimize the estimated preliminary pose, and obtaining a refined motion estimation between the frames.

18 Claims, 4 Drawing Sheets

(51) Int. Cl.
　　　*G06T 7/40*　　　(2017.01)
　　　*G06T 7/50*　　　(2017.01)
(52) U.S. Cl.
　　　CPC ............... *G06T 2207/10028* (2013.01); *G06T 2207/30244* (2013.01)

(56) References Cited

FOREIGN PATENT DOCUMENTS

| CN | 111105460 | 5/2020 |
| CN | 112802096 | 5/2021 |

OTHER PUBLICATIONS

Written Opinion of the International Search Authority in corresponding International application No. PCT/CN2021/107088.

\* cited by examiner (a) RGB-D frame    (b) Motion estimation between frames    (c) Fast pose optimization    (d) Fusion and surface reconstruction

ONLINE MATCHING AND OPTIMIZATION METHOD COMBINING GEOMETRY AND TEXTURE, 3D SCANNING DEVICE, SYSTEM AND NON-TRANSITORY STORAGE MEDIUM

CROSS-REFERENCE TO RELATED APPLICATIONS

This application is a continuation-in-part of an international application No. PCT/CN2021/107088 field on Jul. 19, 2021. This international application claims priority to Chinese application No. 202110625611.5, filed with the Chinese Patent Office on Jun. 4, 2021. The entirety of the two applications is hereby incorporated herein by reference.

TECHNICAL FIELD

The present disclosure generally relates to a field of image recognition, in particular, relates to an online matching and optimization method combining geometry and texture, a three-dimensional (3D) scanning device, a 3D scanning system, and a non-transitory storage medium.

BACKGROUND

In recent years, 3D scanning relates to a fast 3D digitization technology, which has been increasingly used in various fields, such as reverse engineering, industrial inspection, computer vision, computer graphics (CG) production, etc. Especially in a rapidly developing 3D printing and intelligent manufacturing field, 3D scanning, as a front-end 3D digitization and 3D visual sensing technology, has become an important part of an industrial chain. Simultaneously, various applications of the 3D scanning have higher requirements in terms of cost, practicability, accuracy, and reliability of the 3D scanning.

As conventional 3D scanning methods, such as a direct 3D scanning method, a 3D scanning method for matching directly with pixel grayscale, cause a 3D scanning system to have poor adaptability to optical changes, and are greatly disturbed by surrounding environment, resulting in an unstable registration result, and a large pose estimation deviation. Simultaneously, in the 3D scanning methods, all image frames are optimized together when optimizing. As the amount of data processing is large, a problem of low optimization efficiency is existed. In addition, the conventional 3D scanning methods lack an effective penalty mechanism, and have a low efficiency of filtering out false matching results or low-confidence results.

SUMMARY

The present disclosure provides an online matching and optimization method combining geometry and texture and a 3D scanning system.

A technical solution adopted by the present disclosure to solve above technical problem relates to the online matching and optimization method, the online matching and optimization method includes:
  obtaining depth texture images of a target object by using a 3D scanning device, where the 3D scanning device includes a depth sensor and a camera device, the depth texture images comprise depth images and texture images, the depth images are collected by the depth sensor, and the texture images are collected by the camera device;
  estimating and obtaining a preliminary pose of the 3D scanning device according to information of the depth texture images;
  optimizing the preliminary pose according to depth geometric information of the depth texture images and texture information of the depth texture images to obtain a refined motion estimation between frames; and
  eliminating accumulated errors by a method of multi-mode pose optimization based on segmentation.

In one embodiment, the eliminating the accumulated errors by the method of multi-mode pose optimization based on segmentation includes:
  performing segmentation processing on data obtained by the motion estimation between the image frames to obtain a plurality of data segments, and optimizing a pose in each of the data segments, and each of the data segments comprising a plurality of image frames; and
  for the data segments, selecting key frames from the plurality of image frames comprised in the data segments, and combining the key frames and loop closure information to perform simultaneous optimization between the data segments.

In one embodiment, the method further includes:
  for each of the data segments, fixing the pose of the key frames in a corresponding data segment, and optimizing the pose of other image frames in the corresponding data segment to obtain a motion trajectory graph.

In one embodiment, the method further includes:
  by combining a relative pose measured by the depth sensor and an absolute pose estimated by the global motion trajectory graph, build a corresponding objective optimization function; and
  incorporating a preset penalty factor into the objective optimization function, performing matching optimization between frames on the depth texture images by iterative transformation estimation and performing a fusion and surface reconstruction.

In one embodiment, the obtaining the depth texture images of the target object by using the 3D scanning device includes obtaining depth information of the target object and texture information of the target object from the depth texture images by the depth sensor and the camera device alternately projecting the target object.

In one embodiment, the estimating and obtaining the preliminary pose of the 3D scanning device according to the information of the depth texture images includes:
  for each of the image frames currently required to be matched in the depth texture images, obtaining target frames adapted to each of the image frames;
  for each of the image frames and each of the target frames, extracting corresponding image feature data, and performing image feature matching on image frames and target frames corresponding to the image frames, and obtaining a plurality of initial feature pairs; and
  selecting a preliminary transformation matrix from the plurality of initial feature pairs, and estimating the preliminary pose of the depth sensor according to the preliminary transformation matrix.

In one embodiment, the optimizing the preliminary pose according to depth geometric information of the depth texture images and texture information of the depth texture images to obtain refined motion estimation between frames includes:
  combining a geometric constraint and a texture constraint to build an optimization function; and performing an optimization calculation on the optimization goal by using a nonlinear optimization method, obtaining a refined motion estimation between the frames.

In one embodiment, the optimization function includes:

performing an optimization according to gradient information between current frames and the target frames.

In one embodiment, the objective optimization function is $E2=\Sigma_{i,j}\rho(e^2(p_i, p_j; \Sigma_{i,j}T_{i,j}))$;

where an estimated absolute pose after is taken as a node, $p_i$ represents node i, $p_j$ represents node j, $T_{i,j}$ represents the relative pose between the node i and the node j, $\Sigma_{i,j}$ represents a sum of all constraint pairs, $e^2(p_i, p_j; \Sigma_{i,j}T_{i,j})=e(p_i, p_j; T_{i,j})^T\Sigma_{i,j}^{-1}e(p_i, p_j; T_{i,j})$, $e(p_i, p_j; T_{i,j})=T_{i,j}-p_i^{-1}p_j$, $\rho$ is the preset penalty factor incorporated into the objective optimization function.

The present disclosure also relates to a 3D scanning device, including:

an acquisition unit configured to obtain depth texture images of a target object by using a 3D scanning device, wherein the 3D scanning device comprises a depth sensor and a camera device, the depth texture images comprise depth images and texture images, the depth images are collected by the depth sensor, and the texture images are collected by the camera device;

a frame motion estimation module configured to estimate and obtain a preliminary pose of the 3D scanning device according to information of the depth texture images;

the frame motion estimation module further configured to optimize the preliminary pose according to depth geometric information of the depth texture images and texture information of the depth texture images to obtain a refined motion estimation between frames; and a fast pose optimization module configured to eliminate accumulated errors by a method of multi-mode pose optimization based on segmentation.

The present disclosure also relates to an on-transitory storage medium having stored thereon instructions that, when executed by at least one processor, causes the least one processor to execute instructions of the online matching and optimization method combining geometry and texture.

The present disclosure also relates to a 3D scanning device, including a processor and a non-transitory storage medium coupled to the processor and configured to store a plurality of instructions, which cause the processor to execute instructions of the online matching and optimization method combining geometry and texture.

When implanting the online matching and optimization method combining geometry and texture, device and the 3D scanning device of the present disclosure, on the one hand, the present disclosure combines double constraints including geometric and texture, make full use of the texture information, and calculates the texture images to obtain eigenvalues instead of raw pixel intensities and the eigenvalues are insensitive to light and have strong anti-interference ability, therefore, making the system more adaptable to optical changes and making registration results of the system are more robust. On the other hand, the strategy of coarse to fine is adopted to decompose and simplify complex problems: at first, the pose is initially estimated by the features, and then the pose is refined to obtain an accurate pose estimation gradually. In addition, a penalty factor is added to the subsequent optimization objective function, so that different constraint pairs can be well checked and filtered without additional computational cost, thus ensuring the accuracy and stability of the optimization. In addition, a segmented multi-mode optimization strategy, the problems of the present disclosure can be modeled at different abstraction levels to achieve fast and accurate optimization.

BRIEF DESCRIPTION OF THE DRAWINGS

Implementations of the present disclosure will now be described, by way of embodiment, with reference to the attached figures.

DETAILED DESCRIPTION

Figure 1:
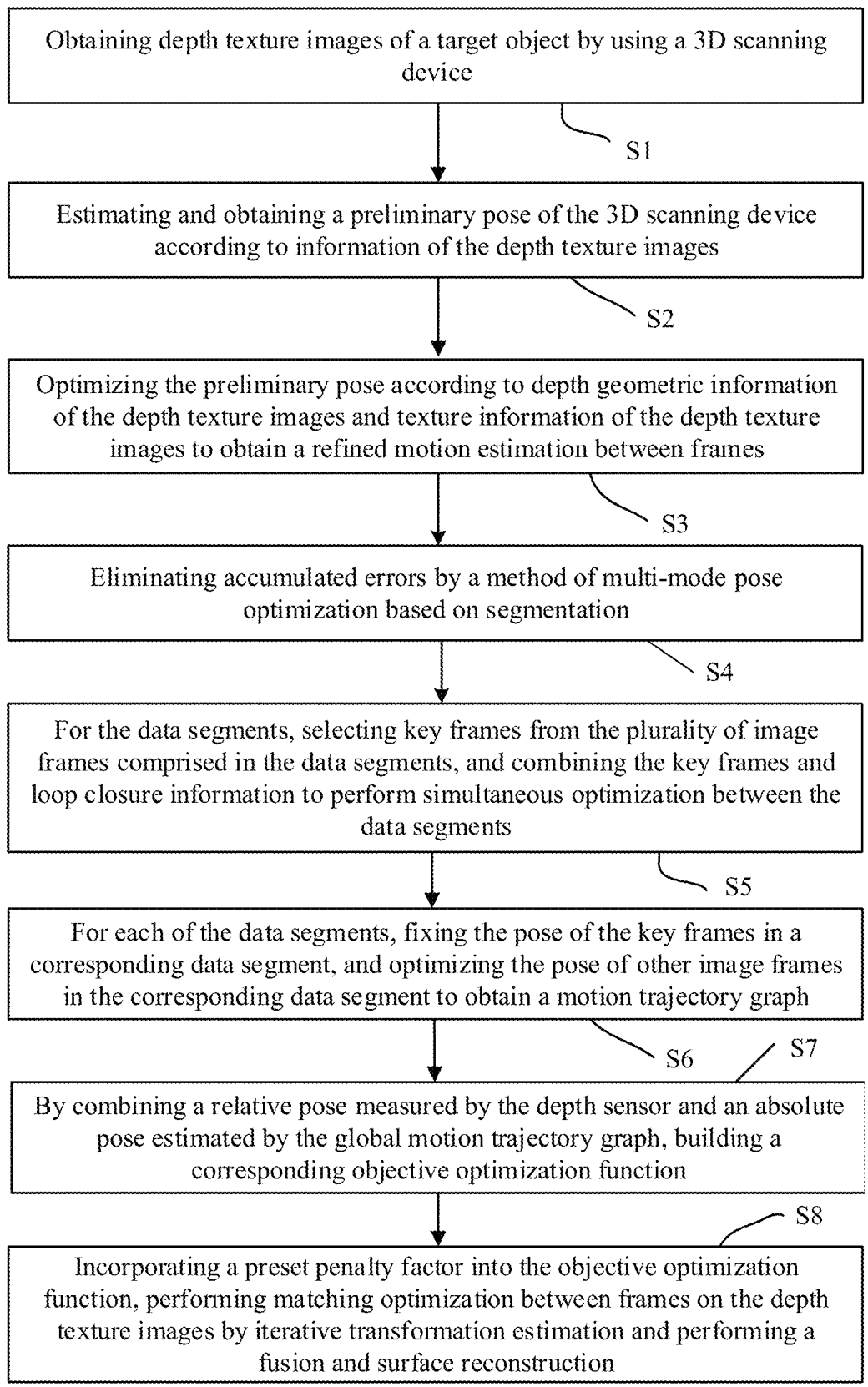
FIG. 1 is a flowchart of one embodiment of an online matching and optimization method combining geometry and texture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

In order to have a clearer understanding of technical features, purposes and effects of the present disclosure, specific embodiments of the present disclosure will now be described in detail with reference to the accompanying drawings.

FIG. 1 illustrates a flowchart of one embodiment of an online matching and optimization method combining geometry and texture. The method is provided by way of example, as there are a variety of ways to carry out the method. Each step shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at step S1.

Step S1, a 3D scanning device is used to obtain depth texture images of a target object.

In one embodiment, pairs of the depth texture images with a one-to-one corresponding relationship are obtained, and the pairs of the depth texture images include depth images and texture images. The depth images are collected by a depth sensor. The texture images are collected by a camera device.

Figure 2:
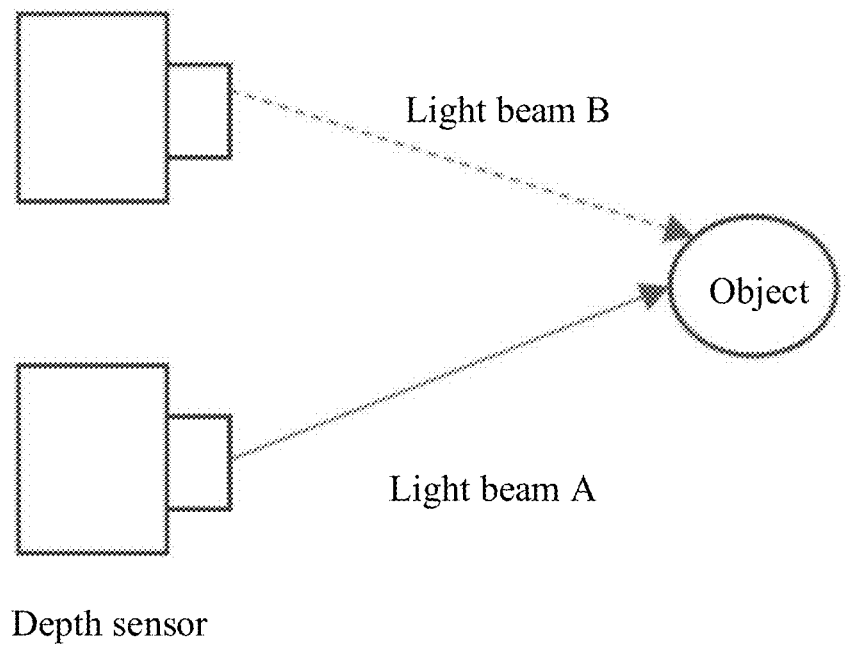
FIG. 2 is a schematic diagram of one embodiment of a typical optical path of a 3D scanning system.
Figure 3:
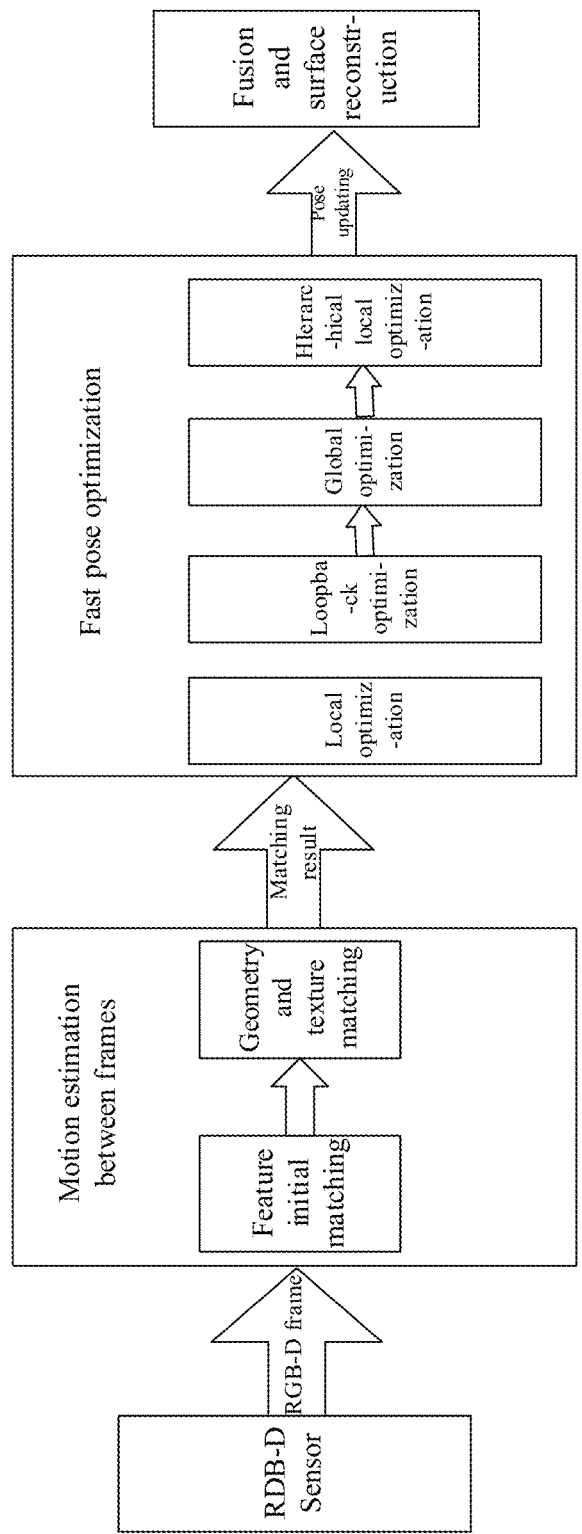
FIG. 3 is a block diagram of one embodiment of online matching and optimization process details combining geometry and texture.

FIG. 2 refers to a typical optical path of a 3D scanning system. In FIG. 2, two optical paths formed by light beam A and light beam B are existed. The light beam A is structured light. After the light beam A penetrating a specific coding pattern as white light, the light beam A can be further projected to a measured object. The light beam B is a texture illumination light, and the light beam B is directly projected to the measured object as white light. In addition, while the light beam B is projected, the camera device will turn on a photo-taking function, and an exposure time of the camera device is strictly synchronized with a time pulse projected by the light beam B. In one embodiment, when a single projection of the light beam A is completed, the camera device also completes a single shot of the measured object projected by the light beam A; immediately when the beam B starts another single projection, and the camera device completes a single photo of the measured object projected by the beam B, therefore, a single cycle of a measurement process of the measured object is completed. When the measurement process is repeated with a certain repetition frequency under a condition that a relative position and a relative angle between the 3D scanning device and the measured object are continuously changed, a 3D measurement of a structure of an object is completed.

Optionally, in one embodiment, the 3D scanning device can be applied in a continuous and fast measurement mode. In a current mode, the light beams A and B will be projected alternately to complete the measurement of the measured object. In one embodiment, the light beam emitted by the 3D scanning device will be output in a form of high-power short pulses, which provides a good foundation for subsequent high-precision measurements. In one embodiment, an instantaneous power of the light beam A can reach kilowatts scale, and a pulse width of the light beam A can reach hundreds of microseconds scale. An instantaneous power of the light beam B can reach hundreds of watts scale, and a pulse width of the light beam B can reach hundreds of microseconds scale. A time difference between the light beams A and B and a camera exposure time for the light beams A and B are on the hundreds of microseconds scale.

Step S2, a preliminary pose of the 3D scanning device is estimated and obtained according to information of the depth texture images.

In one embodiment, a strategy of coarse to fine is adopted to perform feature matching on the depth texture images corresponding to a current frame and on the depth texture images corresponding to the target frame, so as to estimate the preliminary pose of the depth sensor in the 3D scanning system.

Further, estimating the preliminary pose of the depth sensor includes:

step S21, for each of the image frames currently required to be matched in the depth texture images, obtaining target frames adapted to each of the image frames;

step S22, for each of the image frames and each of the target frames, extracting corresponding image feature data, and performing image feature matching on the image frames and the target frames corresponding to the image frames, and obtaining a number of initial feature pairs; and step S23, selecting a preliminary transformation matrix from the number of initial feature pairs.

In one embodiment, the present disclosure extracts SIFT features from the obtained RGB images, and performs feature matching on the current frame and the target frames according to the SIFT features. It should be noted that the SIFT is a widely used feature detector and a descriptor, and a detail degree and a stability in a description of feature points is significantly higher than that of other features. In a SIFT matching process, matching is performed by finding a best candidate of each key point of a nearest neighbor frame $F_i$ in image frame $F_j$. The above brute matching method can obtain N pairs of the initial feature pairs between frame $F_j$ and frame $F_i$, represented by a vector (U;V). The initial feature pairs include correct data (Inliers) and abnormal data (Outliers). In order to filter out the correct data from matched feature pairs, the present disclosure uses a RANSAC algorithm to filter valid sample data from a sample data set containing the abnormal data. An idea of RANSAC algorithm is: randomly selecting a set of RANSAC samples from N RANSAC samples and calculating a transformation matrix (r;t); according to the transformation matrix (r; t), calculating a number of consistency point sets that satisfy a preset error metric function (see formula (1) below), that is, a number f of interior point (inliers), see the following formula (2). By Iterating in loops, a consistent set with a largest f is obtained, then an optimal transformation matrix is calculated by the consistent set. The formula (1) and the formula (2) are illustrated as follow:

$$I(U_i, V_i, r, t) = (\sqrt{(P_i - (r;t) \cdot Q_i)^2} < d)(N_{Pi} \cdot (r \cdot N_{Qi}) < \theta) \quad (1),$$

$$f(r,t) = \Sigma_i^N I(U_i, V_i, r, t) \quad (2).$$

$I(U_i, V_i, r, t)$ indicates that whether an i-th matching point pair $(U_i, V_i)$ can satisfy the preset conditional thresholds d, θ under constraints of the current transformation matrix (r;t). When the i-th matching point pair $(U_i, V_i)$ can satisfy the preset conditional thresholds d, θ, I=1, otherwise, I=0. $N_{Pii}$ refers to a unit normal vector of a 3D point $P_i$, and $N_{Qi}$ refers to a unit normal vector of a 3D point $Q_i$. N is a total number of the matching point pairs. f(r,t) is a number of the interior points.

Step S3, the preliminary pose is optimized according to the depth geometric information of the depth texture images and texture information of the depth texture images to obtain refined motion estimation between frames.

In one embodiment, a geometric constraint and a texture constraint are combined to optimize the preliminary pose estimated in step S2, and the refined motion estimation between the frames are obtained.

In one embodiment, combining the geometric constraint and the texture constraint to optimize the preliminary pose estimated in step S2, and obtaining the refined motion estimation between the frames includes following steps.

Step S31, an optimization function E1 is built according to following formula (3):

$$E1 = \mathrm{argmin}\ \Sigma_{(p,q) \in K_{i,j}}{}^m ((1-\omega)*G + \omega*L) \quad (3);$$

where, G is the geometric constraint, L is the texture constraint, ω is a confidence level of the texture constraint, $K_{i,j}$ is a set of matching point pairs, p is the 3D point of the image frame q is a corresponding point corresponding to the 3D point p in the image frame j, m is a total number of preset matching point pairs.

In one embodiment, combined with the geometric constraint and the texture constraint, the goal of minimization includes two parts: one part of the two parts is a distance between each target point and a tangent plane of corresponding source point of each target point, and the other part of the two parts is a gradient error between each target point and corresponding source point of each target point. The two parts will assign different weights w according to practical application.

In one embodiment, an optimization is performed according to the gradient information between the current frames and the target frames.

Specifically, in the set of matching point pairs $k_{i,j}$ corresponding to the current frame $F_i$ and target frame $F_j$, $p=(p_x, p_y, p_z, 1)^T$ is source point cloud, $q=(q_x, q_y, q_z, 1)^T$ is a target point cloud corresponding to p, $n=(n_x, n_y, n_z, 1)^T$ is the unit normal vector, $g_p$ is the gradient value of the source point cloud p, $g_q$ is the gradient value of the target point cloud q, m is the number of matching point pairs. When performing an optimization of the formula (3), the goal of each iteration of the optimization is to find an optimal $(r_{opt}; t_{opt})$, and $(r_{opt}; t_{opt})$ satisfies following formula (4):

$$(r_{opt}; t_{opt}) = \mathrm{argmin}\ \Sigma_{(p,q) \in k_{i,j}}{}^m ((1-\omega)*((p-(r;t) \cdot q) \cdot n)^2 + \omega*(g_p - g_q)^2) \quad (4).$$

Step S32, the optimization calculation is performed on the optimization goal by using a nonlinear optimization method, and when a preset iteration end condition is reached, the refined motion estimation between the frames is obtained according to the optimal transformation matrix output by a last iteration of the optimization calculation.

In one embodiment, in order to solve an objective function (optimization function E1), the initial transformation matrix is defined as a vector of six parameters, which is $\xi=(\alpha,\beta,\gamma,a,b,c)$, the initial transformation matrix can be linearly expressed according to formula (5):

$$T^{k+1} \approx \begin{pmatrix} 1 & -\gamma & \beta & \alpha \\ \gamma & 1 & -\alpha & b \\ -\beta & \alpha & 1 & c \\ 0 & 0 & 0 & 1 \end{pmatrix} T^k; \quad (5)$$

where, $T^k$ is the transform estimate from the last iteration, the Gauss-Newton method $J_r^T J_r \xi = -J_r T^r$ is currently used to solve for parameter ξ, and parameter ξ is applied to $T^k$ to update T, where r is a residual and $J_r$ is a Jacobian matrix.

In one embodiment, the preset iteration end condition may be reaching a preset maximum number of iterations, etc., and may be flexibly adjusted according to actual application scenarios in different embodiments.

In the above embodiment, dual constraints of geometry and texture are combined, and texture information is fully utilized, to calculate and solve the texture image, and obtain eigenvalues that are insensitive to illumination and have strong anti-interference ability to replace raw pixel intensities to replace the raw pixel intensity, therefore, system is more adaptable to optical changes and registration results are more robust.

Step S4, eliminating accumulated errors by a method of multi-mode pose optimization based on segmentation, includes:

segmentation processing is performed on data obtained by the motion estimation between the frames to obtain a number of data segments, and the pose in each of the data segments are optimized, and each of the data segments includes a number of image frames.

Step S5, for the data segments, key frames are selected from the number of image frames included in the data segments, and the key frames are combined with loop closure information to perform simultaneous optimization between the data segments.

A selection of the key frames needs to meet at least one of the following conditions.

(1) There is at least one key frame in every N image frames to express global information by the key frame.

(2) When a current image frame can match a previous image frame, but the current image frame cannot match a preset reference key frame, the previous image frame of the current image frame will be added to a preset key frame set to ensure a continuity of trajectory tracking.

(3) When the current image frame can match the previous image frame, and the current image frame can also match the preset reference key frame, but an overlap ratio between the current image frame and the preset reference key frame is not enough, the current image frame needs to be added to the preset key frame set to ensure that an overlap between adjacent key frames is existed.

In one embodiment, an estimation of an absolute pose of the depth sensor will have a large pose error over time. In addition, after partial optimization measures of step S4 are implemented, the pose information between data segments does not have global consistency, and an accumulated pose error still exists. In order to overcome the above problems, in one embodiment, the loop closure information and each of the key frames are used to perform simultaneous optimization between data segments. It should be noted that the loop closure information is usually calculated directly based on images or features of the images. In one embodiment, in order to obtain accurate loop closure information, the present disclosure adopts a method of matching image frames to match adjacent key frames in pairs and forms a corresponding loop when a matching result is successful and the overlap rate reaches a preset threshold.

In addition, since key frames run through the tracking process and fully reflect overall situation, in order to improve an efficiency of pose optimization, not all image frames are involved in the global optimization in this embodiment, but one image frame is selected from each data segment to represent the data segment, and the selected image frames are collectively referred to as the key frame. Combined with the loop closure information for global optimization, most of the accumulated pose errors can be quickly eliminated by the global optimization.

In the above embodiments, based on a segmented multi-mode optimization strategy, the problem can be modeled at different abstraction levels to achieve fast and accurate optimization.

Step S6, for each of the data segments, the pose of key frames in a corresponding data segment is fixed respectively, and the pose of other image frames in the corresponding data segment is optimized to obtain a global motion trajectory graph, which is consistent and transitional smooth.

In one embodiment, by an optimization of a global pose graph, an update of the pose of the key frame has been completed. However, in order to obtain a motion trajectory which is globally consistent and transitional smooth, the current partial pose also needs to be updated. Therefore, the layered processing idea is adopted in this embodiment: all image frames are not optimized at the same time, the pose of each key frame is fixed, and only the pose of other image frames in the data segment is optimized.

Step S7, by combining a relative pose measured by the depth sensor and the absolute pose estimated by the global motion trajectory graph, a corresponding objective optimization function is built.

Step S8, a preset penalty factor is incorporated into the objective optimization function to perform iterative transformation estimation, the accumulated pose error generated along with an accumulated increase of a number of scanned image frames during a matching process of the image frames is eliminated, and a fusion and surface reconstruction is performed.

In one embodiment, in step S8, the preset penalty factor is incorporated into the objective optimization function E2, and the expression formula of the objective optimization function E2 is illustrated as follow:

$$E2=\Sigma_{i,j}\rho(e^2(p_i,p_j;\Sigma_{i,j}T_{i,j})) \quad (6)$$

Where, the estimated absolute pose is taken as a node, $p_i$ represents node i, $p_j$ represents node j, $T_{i,j}$ represents the relative pose between the node i and the node j, $\Sigma_{i,j}$ represents a sum of all constraint pairs, where a constraint pair includes a geometric constraint and a texture constraint corresponding to the geometric constraint, $e^2(p_i, p_j; \Sigma_{i,j}T_{i,j})$ =$e(p_i, p_j; T_{i,j})^T \Sigma_{i,j}^{-1} e(p_i, p_j; T_{i,j})$, $e(p_i, p_j; T_{i,j})=T_{i,j}-p_i^{-1}p_j$, $\rho$ is the preset penalty factor incorporated into the objective optimization function.

In one embodiment, $$\rho(x) = \frac{\mu x^2}{\mu + x^2}, \mu = d^2,$$

d is a surface diameter of a reconstructed object. In one embodiment, considering that an appropriate penalty function can perform well verification and filtering without adding additional computational cost, a Geman-mclure function in M estimation method is selected. The Geman-mclure function is $$\rho(x) = \frac{\mu x^2}{\mu + x^2}.$$

Since above formula (6) is difficult to directly optimize, at current, a relationship is supposed as L={l}, and the objective optimization function E2 is supposed as:

$$E2=\Sigma_{i,j}l(e^2(p_i,p_j;\Sigma_{i,j}T_{i,j})+\Sigma_{i,j}\psi(l) \quad (7);$$

Where, $\psi(l)=\mu(\sqrt{l}-1)^2$, after minimize the objective optimization formula E2 and taking a partial derivative of l, $$l = \left(\frac{\mu}{\mu + E2}\right)^2$$

is obtained. In actual calculation of E2, l is regarded as a confidence level, and since constraints with smaller residuals give more weight to the resulting errors, the constraints are more credible; conversely, the constraints with larger residuals are less credible. In this way, a purpose of verification and elimination is achieved, and a robust optimization effect is obtained. In addition, a selection of parameter μ is also very important. In one embodiment, $\mu=d^2$, and d represents the surface diameter of the reconstructed object, and controls a range of significant influence of the residual on a target object. A larger μ makes the objective function smoother and allows to use more counterparts to perform optimization. As μ decreases, the objective function becomes sharper, more anomalous matches are eliminated, and data involved in optimization is more accurate.

In order to solve a nonlinear squared error function problem, the transformation matrix is also transformed according to formula (5) in the current embodiment. Considering the pose graph, only a small number of nodes have connections of direct edge, that is, a sparsity of the pose graph, and at the same time, for numerical stability, a sparse BA algorithm is used to solve the problem in the current embodiment. The sparse BA algorithm is usually optimized by using a Levenberg-Marquardt (LM) method. The LM method adds a positive definite diagonal matrix on the basis of Gauss-Newton to calculate ξ. The positive definite diagonal matrix can be $(J_r^T J_r + \lambda I)\xi = -J_r$.

Figure 4:
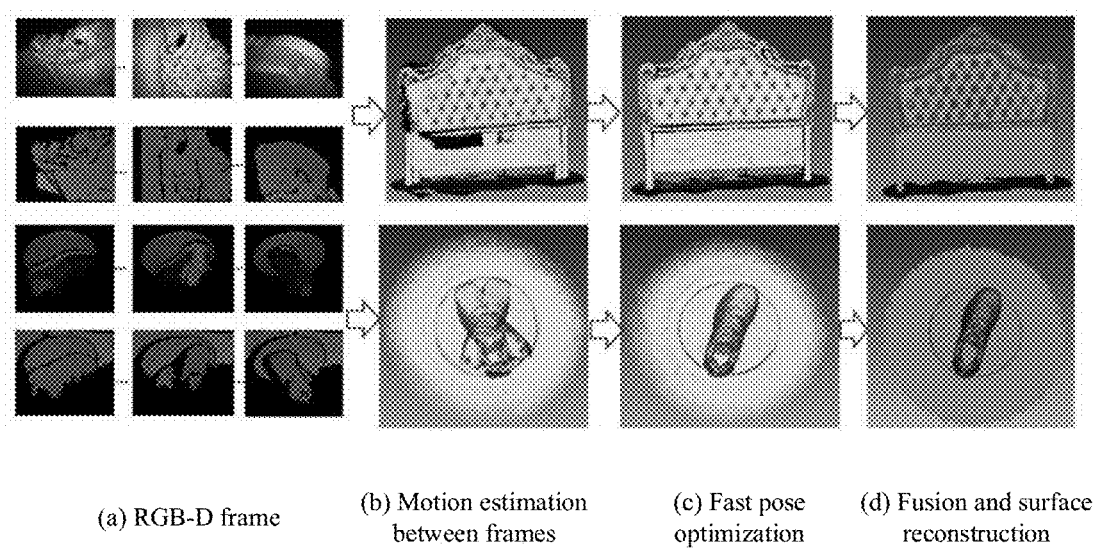
FIG. 4 is an effect diagram of a fusion and surface reconstruction.

It should be noted that an effect diagram of a fast pose optimization is shown in FIG. 4c. An effect diagram of fusion and surface reconstruction is shown in FIG. 4d.

In one embodiment, a 3D scanning system applied to the online matching and optimization method is also illustrated. The scanning system includes:

an acquisition unit, configured to obtain pairs of the depth texture images with a one-to-one corresponding relationship, and the pairs of the depth texture images including the depth images collected by the depth sensor and the texture images collected by the camera device;

a frame motion estimation module, configured to adopt the strategy of coarse to fine to perform feature matching on the depth texture images corresponding to the current frame and the depth texture images corresponding to the target frames, and estimate the preliminary pose of the depth sensor in the 3D scanning system, and combine the geometric constraint and the texture constraint to optimize the preliminary pose, and obtain the refined motion estimation between the frames;

a multi-mode optimization module, configured to perform segmentation processing on data obtained by the motion estimation between the frames to obtain a number of data segments, and optimize the pose in each of the data segments, and each of the data segments including a number of image frames; for the data segments, select the key frames from the number of image frames included in the data segments, and combine the key frames and the loop closure information to perform simultaneous optimization between the data segments; fixes the pose of the key frames in a corresponding data segment respectively, and optimize the pose of other image frames in the corresponding data segment to obtain the global motion trajectory graph, which is consistent and transitional smooth;

a cumulative error cancellation module, configured to build a corresponding objective optimization function by combining a relative pose measured by the depth sensor and the absolute pose estimated by the global motion trajectory graph; further configured to incorporate the preset penalty factor into the objective optimization function to perform iterative transformation estimation, eliminate the accumulated pose error generated along with an accumulated increase of a number of scanned image frames during the matching process of the image frames, and fusion and surface reconstruction is performed.

In one embodiment, the depth sensor includes a projection module and a depth information collection module. The projection module is used to project white light or a structured light beam with a specific wavelength to the surface of the measured object. The depth information collection module is used to collect the depth information of the surface of the measured object when the projection module projects the structured light beam. In one embodiment, the camera device includes a texture information collection module. The texture information collection module is used to collect the texture information on the surface of the measured object when the camera device projects the texture illumination beam to the surface of the measured object.

In one embodiment, the structured light beam and the texture illumination light beam are alternately projected, and when a single projection of the structured light beam is completed, the depth information on the surface of the measured object is collected by the depth information collection module, and then the projection of the texture lighting beam is turned on, and the texture information of the surface of the measured object projected by the texture illumination beam is collected by the camera device in a single time.

The above embodiment relates to a single cycle of the measurement process of the texture information and the depth information on the surface of the measured object. When the measurement process is repeated with a certain repetition frequency, relative positions and relative angles between the camera device, the depth sensor and the measured object will change continuously, and a continuous measurement of the structure of the measured object can be completed.

In one embodiment, a computer readable storage medium is also illustrated. The computer readable storage medium stores computer program. When the computer program is executed by a processor, the steps of any one of the embodiments of the online matching and optimization method. In one embodiment, the computer readable storage medium includes a non-transitory storage medium.

In one embodiment, a 3D scanning device applied to the online matching and optimization method is also illustrated. The 3D scanning device includes a storage and a processor. The storage stores the computer program, and the processor performs the steps of the embodiments of the online matching and optimization method.

When the online matching and optimization method combining geometry and texture and the 3D scanning device of the present disclosure are implemented, on the one hand, the present disclosure combines double constraints including geometric and optical, make full use of the texture information, and calculates the texture images to obtain eigenvalues instead of raw pixel intensities and the eigenvalues are insensitive to light and have strong anti-interference ability, therefore, making the system more adaptable to optical changes and making registration results of the system are more robust. On the other hand, the strategy of coarse to fine is adopted to decompose and simplify complex problems: at first, the pose is initially estimated by the features, and then the pose is refined to obtain an accurate pose estimation gradually. In addition, a penalty factor is added to the subsequent optimization objective function, so that different constraint pairs can be well checked and filtered without additional computational cost, thus ensuring the accuracy and stability of the optimization. In addition, a segmented multi-mode optimization strategy, the problems of the present disclosure can be modeled at different abstraction levels to achieve fast and accurate optimization.

Exemplary embodiments of the present disclosure have been described in conjunction with the accompanying drawings, but the present disclosure is not limited to above-mentioned exemplary embodiment. The exemplary embodiments described above are only illustrative, not restrictive. Under enlightenments of the present disclosure, those skilled in the art can make any forms without departing from the spirit of the present disclosure and the scope protected by the claims, and these all belong to the protection of the present disclosure.

What is claimed is:

1. An online matching and optimization method combining geometry and texture, comprising:
    obtaining depth texture images of a target object by using a 3D scanning device, wherein the 3D scanning device comprises a depth sensor and a camera device, the depth texture images comprise depth images and texture images, the depth images are collected by the depth sensor, and the texture images are collected by the camera device;
    estimating and obtaining a preliminary pose of the 3D scanning device according to information of the depth texture images;
    optimizing the preliminary pose according to depth geometric information of the depth texture images and texture information of the depth texture images to obtain a refined motion estimation between frames; and
    eliminating accumulated errors by a method of multi-mode pose optimization based on segmentation;
    wherein eliminating the accumulated errors by the method of multi-mode pose optimization based on segmentation comprises:
    performing segmentation processing on data obtained by the motion estimation between the image frames to obtain a plurality of data segments, and optimizing a pose in each of the data segments, and each of the data segments comprising a plurality of image frames; and
    for the data segments, selecting key frames from the plurality of image frames comprised in the data segments, and combining the key frames and loop closure information to perform simultaneous optimization between the data segments.

2. The online matching and optimization method combining geometry and texture as recited in claim 1, further comprising:
    for each of the data segments, fixing the pose of the key frames in a corresponding data segment, and optimizing the pose of other image frames in the corresponding data segment to obtain a motion trajectory graph.

3. The online matching and optimization method combining geometry and texture as recited in claim 2, further comprising:
    by combining a relative pose measured by the depth sensor and an absolute pose estimated by the global motion trajectory graph, building a corresponding objective optimization function; and
    incorporating a preset penalty factor into the objective optimization function, performing matching optimization between frames on the depth texture images by iterative transformation estimation and performing a fusion and surface reconstruction.

4. The online matching and optimization method combining geometry and texture as recited in claim 3, wherein the objective optimization function is $E2=\Sigma_{i,j}\rho(e^2(p_i, p_j;$ $\Sigma_{i,j}T_{i,j}$)), an estimated absolute pose after is taken as a node, $p_i$ represents node i, $p_j$ represents node j, $T_{i,j}$ represents the relative pose between the node i and the node j, $e^2(p_i, p_j; \Sigma_{i,j}T_{i,j})=e(p_i, p_j; T_{i,j})^T\Sigma_{i,j}^{-1}e(p_i, p_j; T_{i,j})$, $e(p_i, p_j; T_{i,j})=T_{i,j}-p_i^{-1}p_j$, ρ is the preset penalty factor incorporated into the objective optimization function.

5. The online matching and optimization method combining geometry and texture as recited in claim 1, wherein the obtaining the depth texture images of the target object by using the 3D scanning device comprises:
   obtaining depth information of the target object and texture information of the target object from the depth texture images by the depth sensor and the camera device alternately projecting light onto the target object.

6. The online matching and optimization method combining geometry and texture as recited in claim 1, wherein the estimating and obtaining the preliminary pose of the 3D scanning device according to the information of the depth texture images comprises:
   for each of the image frames currently required to be matched in the depth texture images, obtaining target frames adapted to each of the image frames;
   for each of the image frames and each of the target frames, extracting corresponding image feature data, and performing image feature matching on image frames and target frames corresponding to the image frames, and obtaining a plurality of initial feature pairs; and
   selecting a preliminary transformation matrix from the plurality of initial feature pairs, and estimating a preliminary pose of the depth sensor according to the preliminary transformation matrix.

7. The online matching and optimization method combining geometry and texture as recited in claim 6, wherein the optimizing the preliminary pose according to depth geometric information of the depth texture images and texture information of the depth texture images to obtain refined motion estimation between frames comprises:
   combining a geometric constraint and a texture constraint to build an optimization function; and
   performing an optimization calculation on an optimization goal by using a nonlinear optimization method, obtaining a refined motion estimation between the frames.

8. The online matching and optimization method combining geometry and texture as recited in claim 7, wherein the optimization function comprises:
   combining a geometric constraint and a texture constraint to build the optimization function; and
   performing an optimization according to gradient information between current frames and the target frames.

9. A 3D scanning device, comprising:
   a processor; and
   a non-transitory storage medium coupled to the processor and configured to store a plurality of instructions, which cause the processor to implement the online matching and optimization method combining geometry and texture according to claim 1.

10. A non-transitory storage medium having stored thereon instructions that, when executed by at least one processor, causes the least one processor to execute instructions of an online matching and optimization method combining geometry and texture, the online matching and optimization method comprising:
    obtaining depth texture images of a target object by using a 3D scanning device, wherein the 3D scanning device comprises a depth sensor and a camera device, the depth texture images comprise depth images and texture images, the depth images are collected by the depth sensor, and the texture images are collected by the camera device;
    estimating and obtaining a preliminary pose of the 3D scanning device according to information of the depth texture images;
    optimizing the preliminary pose according to depth geometric information of the depth texture images and texture information of the depth texture images to obtain a refined motion estimation between frames; and
    eliminating accumulated errors by a method of multi-mode pose optimization based on segmentation;
    wherein the eliminating the accumulated errors by the method of multi-mode pose optimization based on segmentation comprises:
    performing segmentation processing on data obtained by the motion estimation between the image frames to obtain a plurality of data segments, and optimizing a pose in each of the data segments, and each of the data segments comprising a plurality of image frames; and
    for the data segments, selecting key frames from the plurality of image frames comprised in the data segments, and combining the key frames and loop closure information to perform simultaneous optimization between the data segments.

11. The non-transitory storage medium as recited in claim 10, wherein the method of multi-mode pose optimization based on segmentation further comprises:
    for each of the data segments, fixing the pose of the key frames in a corresponding data segment, and optimizing the pose of other image frames in the corresponding data segment to obtain a motion trajectory graph.

12. The non-transitory storage medium as recited in claim 11, wherein the method of multi-mode pose optimization based on segmentation further comprises:
    by combining a relative pose measured by the depth sensor and an absolute pose estimated by the global motion trajectory graph, build a corresponding objective optimization function; and
    incorporating a preset penalty factor into the objective optimization function, performing matching optimization between frames on the depth texture images by iterative transformation estimation and performing a fusion and surface reconstruction.

13. The non-transitory storage medium as recited in claim 12, wherein the objective optimization function is $E2=\Sigma_{i,j}\rho(e^2(p_i, p_j; \Sigma_{i,j}T_{i,j}))$, an estimated absolute pose after is taken as a node, $p_i$ represents node i, $p_j$ represents node j, $T_{i,j}$ represents the relative pose between the node i and the node j, $\Sigma_{i,j}$ represents a sum of all constraint pairs, $e^2(p_i, p_j; \Sigma_{i,j}T_{i,j})=e(p_i, p_j; T_{i,j})^T\Sigma_{i,j}^{-1}e(p_i, p_j; T_{i,j})$, $e(p_i, p_j; T_{i,j})=T_{i,j}-p_i^{-1}p_j$, ρ is the preset penalty factor incorporated into the objective optimization function.

14. The non-transitory storage medium as recited in claim 10, wherein the obtaining the depth texture images of the target object by using the 3D scanning device comprises:
    obtaining depth information of the target object and texture information of the target object from the depth texture images by the depth sensor and the camera device alternately projecting light onto the target object.

15. The non-transitory storage medium as recited in claim 10, wherein the estimating and obtaining the preliminary pose of the 3D scanning device according to the information of the depth texture images comprises:

for each of the image frames currently required to be matched in the depth texture images, obtaining target frames adapted to each of the image frames;

for each of the image frames and each of the target frames, extracting corresponding image feature data, and performing image feature matching on image frames and target frames corresponding to the image frames, and obtaining a plurality of initial feature pairs;

selecting a preliminary transformation matrix from the plurality of initial feature pairs, and estimating a preliminary pose of the depth sensor according to the preliminary transformation matrix.

16. The non-transitory storage medium as recited in claim 15, wherein the optimizing the preliminary pose according to depth geometric information of the depth texture images and texture information of the depth texture images to obtain refined motion estimation between frames comprises:

combining a geometric constraint and a texture constraint to build an optimization function;

performing an optimization calculation on an optimization goal by using a nonlinear optimization method, obtaining a refined motion estimation between the frames.

17. The non-transitory storage medium as recited in claim 16, wherein the taking the initial transformation matrix as the optimization goal to build the optimization function comprises:

combining a geometric constraint and a texture constraint to build the optimization function;

performing an optimization according to gradient information between current frames and the target frames.

18. An online matching and optimization method combining geometry and texture, comprising:

obtaining depth texture images of a target object by using a 3D scanning device, wherein the 3D scanning device comprises a depth sensor and a camera device, the depth texture images comprise depth images and texture images, the depth images are collected by the depth sensor, and the texture images are collected by the camera device;

estimating and obtaining a preliminary pose of the 3D scanning device according to information of the depth texture images;

optimizing the preliminary pose according to depth geometric information of the depth texture images and texture information of the depth texture images to obtain a refined motion estimation between frames; and eliminating accumulated errors by a method of multi-mode pose optimization based on segmentation;

wherein the obtaining the depth texture images of the target object by using the 3D scanning device comprises:

obtaining depth information of the target object and texture information of the target object from the depth texture images by the depth sensor and the camera device alternately projecting light onto the target object.

* * * * *